Aug. 19, 1952　　　W. LINES　　　2,607,605
FOLDING BABY CARRIAGE

Filed May 17, 1949　　　　　　　　　2 SHEETS—SHEET 1

Inventor
WALTER LINES,
By
Attorney

Aug. 19, 1952 W. LINES 2,607,605
FOLDING BABY CARRIAGE
Filed May 17, 1949 2 SHEETS—SHEET 2

Inventor
WALTER LINES,
By Robert B Larson
Attorney

Patented Aug. 19, 1952

2,607,605

UNITED STATES PATENT OFFICE 2,607,605

FOLDING BABY CARRIAGE

Walter Lines, Merton, London, England, assignor to Lines Bros. Limited, London, England, a British company Application May 17, 1949, Serial No. 93,745
In Great Britain July 21, 1948

6 Claims. (Cl. 280—41)

1

This invention relates to baby carriages, perambulators or the like in which the handle is arranged to fold.

An object of this invention is to provide a construction in which the handle will be firmly held in the erected position and which will fold into a small space with a smooth movement and will return to the erected position very easily upon the handle being gripped and lifted.

Another object is to provide an improved linkage mechanism for a folding baby carriage.

The invention will be described by reference to the annexed drawings, which show the preferred form of baby carriage embodying it and in which.

Figure 1:
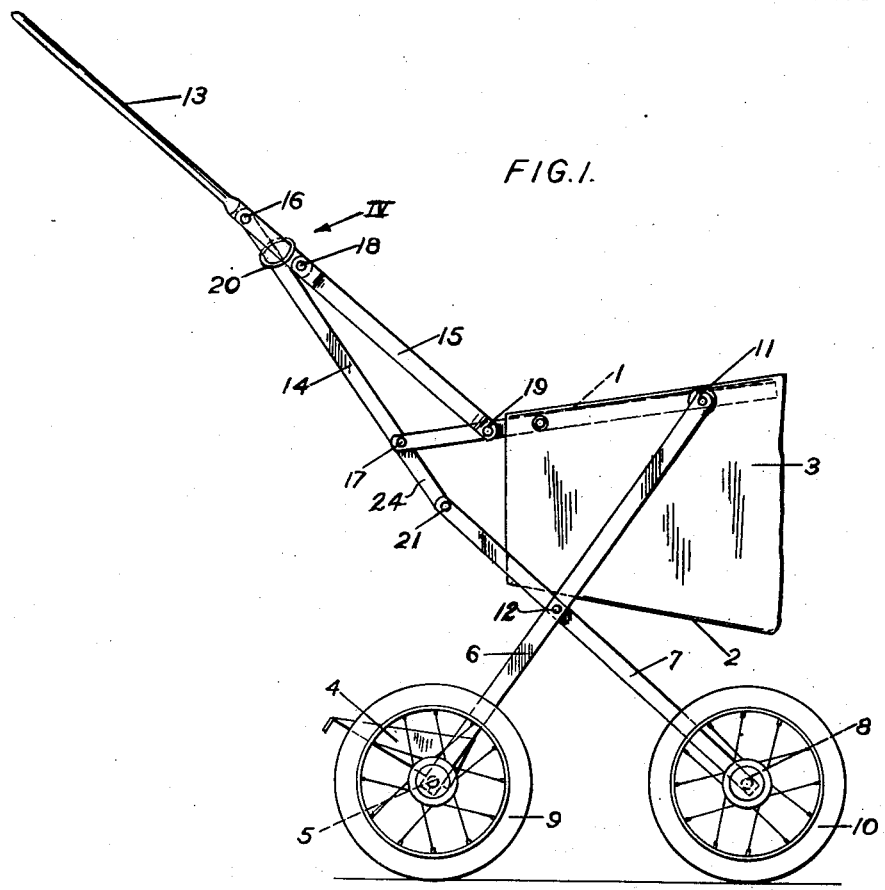
Figure 1 is a side view of the baby carriage in the erected position.

The baby carriage illustrated has a body which consists of a substantially horizontal U-shaped frame member 1 from which a seat 2 is suspended by canvas or like flexible material 3. The baby sits in this body facing to the left, as seen in Figure 1, with its feet on a foot-rest 4. The baby carriage is, of course, symmetrical about the longitudinal centre lines, and for ease of description only the side shown will be described.

Figure 2:
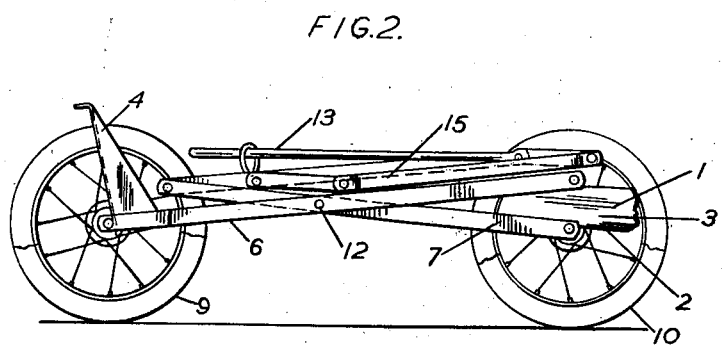
Figure 2 is a side view showing the baby carriage in the completely folded position.

The foot rest 4 is secured to an axle 5 to which the lower end of one member 6 of a pair of crossed frame members is pivotally connected, the other member 7 of this pair being pivotally connected at its lower end to a second axle 8. The axle 5 carries a wheel 9 and the axle 8 a wheel 10, and it will be understood that there are similar wheels at the other side. The upper end of the frame member 6 is pivotally connected at 11 to the frame member 1 and the upper end of the frame member 7 is pivotally connected at 21 to the lower end of a member 24 which is pivotally connected at 17 to the end of the horizontal member 1. The crossed members 6 and 7 are pivotally connected at 12 and relative movement of them about this pivot results in the wheels 9 and 10 being moved apart into the position shown in Figure 2. The parts so far described are not new.

In baby carriages of this general kind it is usual to provide a U-shaped handle. In the present baby carriage the handle is shown at 13

2 and at each side it is connected by two links 14 and 15 to the frame member 1. The link 14 runs from a pivot point 16 a little above the lower end of the handle to the pivot point 17 and in fact it is integral with the member 24, which may be regarded as an extension of it. The link 15 is shorter than the link 14 and it runs from a pivot point 18 close to the free end of the handle to a pivot point 19 displaced from the free end of the member 1. The links 14 and 15 are of unequal length. The distance between the pivot points 17 and 19 is greater than the pivot points 16 and 18 and the difference between these two distances is substantially the same as the difference in the length of the links 15 and 14.

As a result of the construction described the handle can swing from a folded position in which it lies close and substantially parallel to the horizontal frame member to an erected position in which it is inclined to and spaced apart from the horizontal member by the links, which are then themselves inclined at an acute angle to one another.

It will be seen that, as the links 14 and 15 are connected to two different points on the frame member and also to two different points on the handle, they form a quadrilateral with the part of the handle between the points 16 and 18 and the parts of the member 1 between the points 17 and 19. This is an important feature. To hold the handle in the erected position a manually operated device is provided for maintaining one angle of the quadrilateral constant. The device is a ring 20 slidably mounted on the handle to move downwards over the pivot point 16 when the handle is brought into the erected position shown in Figure 1. In this position the handle 13 and the link 14 make an acute angle with one another and the apex of this forms with the ring 20 a rigid triangle, that is to say, the angle between the handle and the link 14 cannot increase so long as the ring is in position. This is another important feature.

Figure 4:
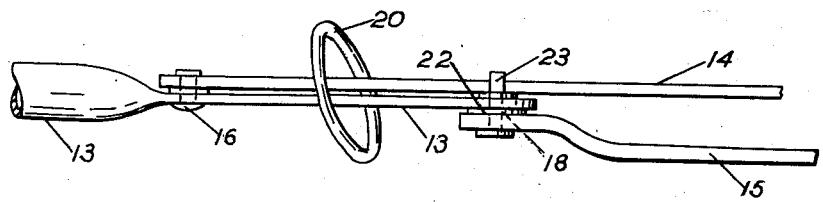
Figure 4 is a view seen along the arrow IV in Figure 1 and is on a larger scale.

Naturally if the manually operated device is a ring as shown, the angle between the handle 13 and the link 14 must also be prevented from decreasing. For this purpose a stop is provided to stop the movement of the links when the erected position is reached, and is formed by the pivot pin 18. As shown in Figure 4 this pin after passing through the link 15 and a washer 22 passes through the handle 13. It has an enlargement 23 which lies in the path of the edge of the link 14, so that when the position shown in Figure 1 is reached, the link 14 hits the enlargement 23 and further movement is prevented.

Figure 3:
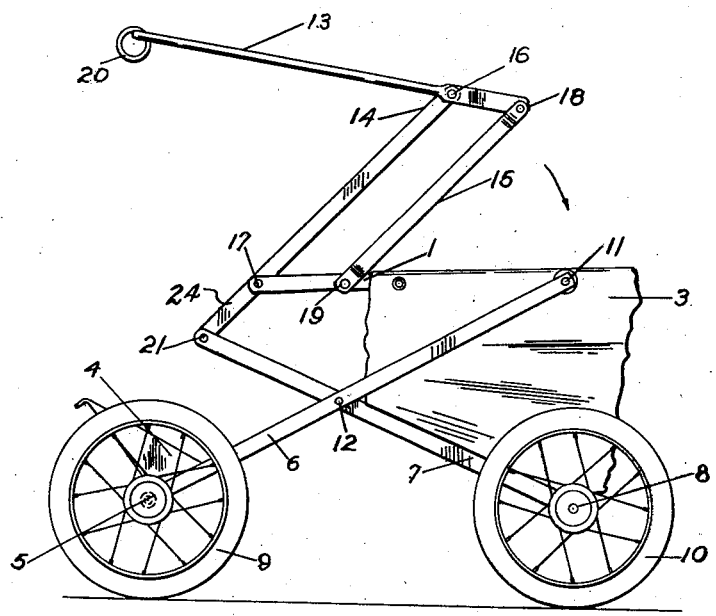
Figure 3 is a side view showing the position of the parts during the folding operation.

When the baby carriage is to be folded the two rings 20 are pulled up the handle by the user and pressure on the top of the handle then causes it to rock into and through the position shown in Figure 3. It will be seen that the quadrilateral described is deformed and the angle between the handle 13 and the link 14 rapidly increases, and in fact the handle is finally brought to lie immediately above the frame member 1. At each side the handle is made substantially equal in length to the member 1 and in the folded position its ends lie directly above those of the member 1 so that in the folded position the baby carriage is extremely compact, as is clearly shown by Figure 2. The movement of the links 14 and 15 simultaneously causes the crossed frame members to collapse vertically and expand horizontally thus folding not only the handle but also the body.

When the baby carriage is to be moved again into the erected position the handle 13 is gripped and it is found that if the parts beneath it are then thrown forwards while a firm grip is kept on the handle the whole frame will open out with great ease and at the conclusion of the opening movement the rings 20 will slide down and hold the handle and thus the whole frame in position.

I claim:

1. A baby carriage having a handle and a folding frame, said frame at each side of the carriage comprising a horizontal member, two links pivoted at separate points to said member and at separate points to said handle, and two crossed lower members pivoted together at their point of crossing and adapted to support wheels at their lower ends, one of said links having an extension projecting below said horizontal member, a pivotal connection between the upper end of one of said lower members and said extension, and a pivotal connection between the other of said lower members and said horizontal member.

2. A folding four-wheeled baby carriage, perambulator or the like, comprising at each side a substantially horizontal member supporting a body, a link crossing the horizontal member and pivoted to it, a handle member pivotally connected to the upper end of said link, two crossed members pivoted to the horizontal member and the lower end of said link respectively and forming an X-frame carrying wheels, and means adapted when the chair is erect to determine both the inclination of said link to the horizontal member and the inclination of the handle member to said link.

3. A folding four-wheeled baby carriage, perambulator or the like, comprising at each side a substantially horizontal member supporting a body, a link crossing the horizontal member and pivoted to it, a handle member pivotally connected to the upper end of the link, two crossed members pivoted to the horizontal member and the lower end of the link respectively and forming an X-frame carrying wheels, and a second link pivoted to the handle and the horizontal member and adapted when the carriage is erect to determine both the inclination of the first link to the horizontal member and thus the angular relation of the crossed members, and the inclination of the handle member to the horizontal member.

4. A folding four-wheeled perambulator or the like comprising at each side a body, a substantially horizontal member supporting said body, a link pivotally connected to the horizontal member, two crossed members pivoted to the horizontal member and to the link respectively and forming an X-frame carrying wheels, and a handle member pivoted to the upper end of the link, the handle member, the link and one of the crossed members being substantially equal in length, and with the carriage erect, extending consecutively in a substantially straight line, and when the chair is folded, forming a shallow Z.

5. A folding four-wheeled baby carriage, perambulator or the like, comprising on each side one limb of a handle, a substantially horizontal member supporting a body, a pivotal linkage connected to the handle limb and to the horizontal member, two crossed members pivoted to the horizontal member and to the linkage respectively and forming an X-frame carrying wheels, and means above the horizontal member adapted to hold the linkage in a position determining the erect position of the X-frame and the handle, and in which, when the frame is erect, said handle and said linkage are held at an acute angle by a stop blocking the decreasing of the angle and a ring slidable over said handle and linkage blocking the increasing of the angle.

6. In a baby carriage, perambulator or the like, a handle and a folding frame, said frame at each side comprising a substantially horizontal frame member, two crossed frame members pivotally connected together and each at its lower end pivoted to an axle, one of the crossed members being pivoted at its upper end to said substantially horizontal member, a pair of links pivotally connected at two different points to said handle and also at two different points to said frame member, one of said links extending downwardly beyond said horizontal frame member and being pivotally connected to the other of said cross frame members, said links together with part of the handle and part of said frame member forming a quadrilateral, and a manually operated device adapted to maintain one angle of said quadrilateral constant when said handle is in the erected position.

WALTER LINES.

REFERENCES CITED

The following references are of record in the file of this patent:

UNITED STATES PATENTS

| Number | Name | Date |
| --- | --- | --- |
| 2,335,484 | Chrisman | Nov. 30, 1943 |
| 2,457,935 | Stackhouse | Jan. 4, 1949 |